(12) United States Patent
Blacklidge

(10) Patent No.: US 7,503,724 B2
(45) Date of Patent: Mar. 17, 2009

(54) METHOD FOR BONDING PREPARED SUBSTRATES FOR ROADWAYS USING A LOW-TRACKING ASPHALT EMULSION COATING

(75) Inventor: Roy B. Blacklidge, Gulfport, MS (US)

(73) Assignee: Blacklidge Emulsions, Inc., Gulfport, MS (US)

( * ) Notice: Subject to any disclaimer, the term of this patent is extended or adjusted under 35 U.S.C. 154(b) by 99 days.

(21) Appl. No.: 11/561,801

(22) Filed: Nov. 20, 2006

(65) Prior Publication Data

US 2007/0141241 A1    Jun. 21, 2007

Related U.S. Application Data

(60) Provisional application No. 60/738,319, filed on Nov. 18, 2005.

(51) Int. Cl.
*B05D 5/00* (2006.01)
*E01C 19/16* (2006.01)

(52) U.S. Cl. .............................. 404/82; 404/72; 404/75; 404/90; 404/101

(58) Field of Classification Search ................... 404/82, 404/75, 77, 79, 90, 101, 108, 111
See application file for complete search history.

(56) References Cited

U.S. PATENT DOCUMENTS

| | | | |
|---|---|---|---|
| 2,229,872 A | 1/1941 | Pullar | |
| 2,646,361 A | 7/1953 | Rostler | |
| 2,706,688 A | 4/1955 | Sommer et al. | |
| 2,851,824 A | 9/1958 | Campbell | |
| 2,927,402 A | 3/1960 | Goren et al. | |
| 3,162,101 A | 12/1964 | Rostler | |
| 3,297,617 A | 1/1967 | Regenstein, Jr. et al. | |
| 3,336,146 A | 8/1967 | Henschel | |
| 3,404,108 A | 10/1968 | Regenstein, Jr. et al. | |
| 3,432,321 A | 3/1969 | Rostler | |
| 3,703,393 A | 11/1972 | Koons | |
| 4,094,696 A | 6/1978 | Burris | |
| 4,236,951 A | 12/1980 | Krchma et al. | |
| 4,405,375 A | 9/1983 | Gibson et al. | |
| 4,437,896 A | 3/1984 | Partanen | |
| 4,561,905 A | 12/1985 | Kittle | |
| 4,571,116 A | 2/1986 | Patil et al. | |
| 4,878,950 A | 11/1989 | Halasz et al. | |
| 5,296,264 A | 3/1994 | Blacklidge et al. | |
| 5,503,871 A | 4/1996 | Blacklidge et al. | |
| 5,735,634 A * | 4/1998 | Ulrich et al. | ................. 404/102 |
| 5,769,567 A * | 6/1998 | Durand et al. | ................. 404/75 |
| 6,033,147 A * | 3/2000 | Richter | .................. 404/79 |
| 6,113,659 A | 9/2000 | Logaraj et al. | |
| 6,158,920 A * | 12/2000 | Malot | .......................... 404/27 |
| 6,194,472 B1 | 2/2001 | Logaraj et al. | |
| 2004/0204939 A1 * | 10/2004 | Liu et al. | ..................... 704/239 |

FOREIGN PATENT DOCUMENTS

| | | |
|---|---|---|
| SU | 519468 | 6/1976 |
| SU | 916526 | 3/1982 |
| SU | 918444 | 4/1982 |

OTHER PUBLICATIONS

Materials from Exxon Corporation, Process for Oils for The Rubber Industry, (1989), regarding Flexon.
Shellflex Oils, Technical Bulletin Shell Oil Company SOC:506-89, mo. & yr. unavailable.
Chemical Abstract #64742-04-7.
Brochure from : Dust Allayers, Inc., 2720 Park Avenue East, Mansfield, Ohio 44902, mo & yr. unavailable.
Paint—Coating Dictionary, Definitions Committee of the Federation of Scocieties for Coating Technology, (1978), pp. 38, 39, 59, 64, 163, 202, 354, 416, 441, 476, 551, 552, 574, 600 and 601, mo unavailable.
Standard Specifications for Transportation Materials and Methods of Sampling and Testing, American Association of State Highway and Transportation Officials (AASHTO) (1990) pp. vii-xiii, 5, 71-74, 125-126, 145-146, 421, 456-457, 478 and 807-808, mo unavailable.
Standard Specifications for Road and Bridge Construction, Department of Transportation—Florida (1986), pp. 228-235 and 626-635, mo unavailable.

(Continued)

*Primary Examiner*—Raymond W Addie
(74) *Attorney, Agent, or Firm*—Fitch, Even, Tabin & Flannery

(57) ABSTRACT

A method for bonding together an existing substrate layer and a pavement layer, such that a strong adhesive bond is formed by using a tack coat, provided by an asphalt emulsion, in between the layers as the bond coat. The tack coat layer is a low-tracking coating which cures quickly such that the pavement layer may be applied to the substrate, hours to days after the emulsion is applied to the substrate. The asphalt emulsion comprises at least a first phase of from about 30% to about 70% of an asphalt composition, about 30% to about 70% water, and about 0.1% to about 3.0% emulsifying agent, stabilizer and/or additives, or 0.1% to about 30% if polymeric or other additives are also included.

33 Claims, No Drawings

OTHER PUBLICATIONS

Standard Specifications for Road and Bridge Construction, Department of Transportation—Illinois (1988), pp. iii-vi, 172-187; 190-196 and 682-697, mo unavailable.

Standard Specifications for Road and Bridge Construction, Department of Highways—Kentucky (1988), pp. v-viii, 179, 182-183, 185, 189-190, 240-250 and 651-658, mo unavailable.

Standard Specifications for Roads and Bridges, Department of Transportation and Development—Louisiana (1982), pp. iii-v, 161-165 and 474-484, mo unavailable.

Standard Specifications for Road and Bridge Construction, State Highway Commission—Mississippi (1990), pp. i-xi; 101-1-101-13; 405-5-405-8 and 702-1-702-7, mo unavailable.

Standard Specifications for Road and Bridge Construction, Department of Transportation—Oklahoma (1988), pp. i-ix, 3-11, 134-141, 145-153, 157-163 and 394-405, mo unavailable.

Standard Specifications for Highway Construction, State Highway Department—South Carolina (1986), pp. i-xxi, 135, 140, 146-147, 150-151, 156-167, 200, 217-221 and 238-247, mo anavailable.

* cited by examiner

METHOD FOR BONDING PREPARED SUBSTRATES FOR ROADWAYS USING A LOW-TRACKING ASPHALT EMULSION COATING

RELATED APPLICATION

This application claims the benefit of U.S. Provisional Application Ser. No. 60/738,319, filed Nov. 18, 2005.

FIELD

This invention relates generally to a method providing an adhesive tack coat for use between pavement layers, such as between layers of asphaltic compositions or between layers of asphaltic materials and other paving or base materials.

BACKGROUND

Many pavement structures comprise multiple layers of pavement compositions that are applied to a prepared base or foundation. Such pavement structures may include successive layers of pavement materials applied to a base or foundation to build a multi-layer composite structure suitable for use as a vehicle roadway, parking lot or other similar traffic bearing structure. In many instances, such multi-layer structures may comprise one or more layers of asphaltic materials applied to a first, second, third or successive pavement layer. The asphaltic layers typically comprise a binder material containing asphalts, tars and/or other binders, an aggregate rock, shell, recycled pavement materials, or similar materials, and various additives, fillers, etc.

In constructing pavement structures with one or more asphaltic layers, it is often necessary to lay each asphaltic layer down on a preceding pavement layer in a predetermined sequence, with a bonding material between the layers. The bonding material, which also may be referred to as a tack coat, acts to provide a degree of adhesion or bonding between the layers, and in some instances, may fuse the layers together. The tack coat also acts to reduce slippage and sliding of the layers relative to other layers in the pavement structure during use or due to wear and weathering of the pavement structure.

Pavement and road surfaces also require regular maintenance to repair normal wear and tear of the roadway due to vehicular or pedestrian traffic, the effect of weather and environmental conditions, and other factors. In some applications, all or a portion of the traffic bearing surface may be removed through grinding, stripping or other means, and a new pavement layer is applied to the prepared structure. In other applications, a new pavement layer is placed down on top of the existing pavement structure to provide a new or renewed traffic bearing surface. To prepare such preexisting pavement structures for application of an additional, new pavement layer, a tack coat often is applied to the preexisting pavement surface to encourage the adhesion and/or fusion of the new pavement material with the preexisting surface and/or structure.

In many instances, the bonding and/or slippage resistance provided by a tack coat is important during the construction of the pavement structure, as well as in the completed structure. As the pavement is constructed, it is important to avoid dislocation of all or portions of the substrate layers as each successive layer is applied to form the structure. Such damage can be significant at the edges of a roadway, which often are not compacted as well as in the middle of the roadway. In many applications, construction vehicles, or other vehicles are permitted to travel over the partially constructed structure, which also may exert stress on the layers that have been applied to form the roadway causing slippage or shifting of the layers.

A tack or bonding coat also may be applied to a base or substrate layer in advance of the application of the next pavement layer. In the meantime, construction or other vehicles are expected to travel over the tack coat without significantly damaging or reducing the effectiveness of the coating. Such damage often occurs, however, when the tack or bonding coating is picked up on the tires or tracks of vehicles traveling over the coated surface. Where this occurs, the asphalt compositions often are tracked onto other pavement surfaces causing disruption to the surrounding area. This tracking also reduces the effectiveness of the tack coat by displacing a portion of the intended volume from the area awaiting a new pavement layer.

Insufficient adhesion between a new layer of pavement and an existing base course, a previously laid pavement layer, or a prepared pavement surface can cause pavement separation and cracking during construction of the structure, as well as subsequent failures and premature deterioration of the pavement structure and/or surface. Such conditions often require costly repairs, can cause damage to vehicles traveling on the surface and may cause dangerous traffic conditions threatening damage to property and injury to vehicle passengers.

The tack coats typically used in the construction of asphaltic pavement structures are asphalt containing compositions that are prepared as a liquid, flowable, fluid so that they can be effectively and efficiently applied and spread over a prepared base course or pavement surface. Such asphalt bonding compositions can be liquefied in several ways, such as by heating above their melting temperatures, dissolution into solvents or volatile oils to form cutback asphalt compositions, and by emulsification with water. In the case of cutback asphalt compositions, the cutback becomes "cured" as solvents evaporate leaving the desired asphalt composition.

To provide suitable bonding, tack coatings must provide an adhesive, tacky surface after the composition, emulsion or coating is cured to bond and/or fuse the pavement or pavement and base layers. The asphalt materials available for use in tack coats are commercially available in different standard grades, with different properties, based on their viscosity, solids content, chemical composition, and other characteristics. One grading measure is the penetration or "pen" value.

The pen value is based on penetration testing where the relative hardness of the asphalt composition is determined at a predetermined temperature, typically about 77° F. (25° C.). One test uses methods such as those described in ASTM D5 (ASTM International) and AASHTO T49 (American Association of State Highway and Transportation Officials). This test measures the distance in dmm (tenths of a millimeter) that a standard needle, under a standard loading, will penetrate a sample in a given time under known temperature conditions. The resulting distance is often referred to as the penetration or "pen" value.

Another common measure of asphalt compositions is the Ring and Ball Softening Point. This softening point test using methods, such as those described in ASTM D36 and/or AASHTO T53, measures the temperature at which an asphalt composition becomes soft and flowable. As used herein, pen values and softening point values are with reference to the above identified ASTM and AASHTO methods or their equivalents.

Although not formally defined, typically hard (i.e. high melting point) asphalt compositions have pen values of about 40 dmm or less, with softening points greater than about 140° F. (60° C.). Such compositions are often referred to as hard pen or low pen asphalt compositions. Asphalt compositions with pen values between about 40 dmm to about 100 dmm, and with softening points between about 118° F. (48° C.) and about 140° F. (60° C.), are typically referred to as medium, mid, or moderate pen asphalt compositions. Asphalt compositions with pen values greater than 100 dmm and with softening points less than 118° F. (48° C.) are typically referred to as soft or high pen asphalt compositions.

The asphalt compositions often used to form asphalt emulsions for the purposes of forming tack coats typically are soft or medium pen asphalt products. They typically have pen values greater than 40 dmm and softening points less than 140° F. (60° C.). When applied as a tack coat, emulsions using such soft or medium pen asphalt compositions typically provide a relatively sticky, tacky surface under ambient temperature conditions in pavement construction environments. As a result, such tack coats experience significant tracking problems, and may not provide a durable bond between paving surfaces, particularly at elevated temperatures.

Hard pen asphalt compositions (i.e., penetration value of less than about 40 dmm and softening points greater than about 140° F. (60° C.)) have not been used as tack coats in pavement construction due to their high melting points, their limited flowability and very low surface tackiness at ambient temperatures for pavement construction. For example, hard pen asphalt compositions often must be heated to temperatures as high as 400° F. (204° C.) before they become sufficiently flowable to be applied by spreading or spraying, and will have little, if any, surface tackiness when cooled to ambient temperatures for pavement construction. It is normally impractical to maintain hard pen asphalts at such high temperatures for application as a tack coat.

Hard pen asphalt compositions, in addition, are significantly more difficult to emulsify than mid to high (i.e., medium to soft) pen asphalt compositions. Because of their high melting temperatures, hard pen asphalt compositions typically must be heated to relatively high temperatures prior to emulsification, thus often resulting in undesirable emulsion temperatures above the boiling point of water (212° F. (100° C.)). The use of such high temperatures can interfere with the emulsification process, often is impractical in preparing most asphalt containing emulsions, and frequently produces emulsions with undesirable particulate contents and other defects. Additionally, hard pen asphalt emulsions often become unstable during storage and, therefore, must be used shortly after they are prepared. This also renders such products impractical as a tack coat in pavement construction.

Hard pen asphalt compositions and emulsions also have been used in applications where a high melting point is desirable. For example, hard pen asphalt compositions have been used in roofing materials and certain types of asphalt containing sealing compositions. Hard pen asphalt emulsions also have been mixed with clays and sands for use as a seal coating for the exposed surfaces of parking lots and the like.

As a result, cutback asphalts, asphalt emulsions using mid to soft pen asphalts, and mid to soft pen asphalts alone are commonly employed as tack coats for bonding asphaltic pavement materials to preexisting pavements, intermediate pavement courses, and base courses in new construction. Cutback asphalt tack coats typically included asphalt residues in excess of 60% by weight of the total product combined with solvents such as naphthas, kerosenes, oils or other such products to maintain the asphalt compositions in a liquid, flowable condition. The conventional asphalt emulsions typically included products with asphalt residues in a range of from about 25% to 70% or greater by weight of the total product.

A number of difficulties, however, limit the utility of cutback asphalts and conventional asphalt emulsions made with moderate or soft pen asphalt compositions. Some such products can require a relatively long cure time (as long as 2 to 7 days or more) before traffic is permitted to pass over the treated area. Where the next pavement layer cannot be laid down immediately, the cured tack coat remains exposed for extended periods and remains tacky and sticky. Accordingly, vehicle traffic over the treated surfaces often must be shut down until another layer of pavement is applied, and if traffic is allowed to pass, the asphalt tack coatings frequently adheres to the tires and tracks of vehicles traveling over the coated surfaces. This frequently results in lifting and damage to the tack coat and undesirable tracking of the coating to other surfaces via the vehicle tires and tracks.

Damage to the tack coating can substantially interfere with the ability of the coating to properly bond and/or fuse the pavement layers or base together. As a result, the pavement layers may slip or separate with the passage of traffic over the structure and time. This type of damage also may permit water penetration into the pavement surface, which can result in further deterioration due to freeze-thaw cycles or similar stresses. As a result, multiple applications of the tack coat may be required to obtain the desired adhesion between the pavement layers at a significant loss of efficiency and increase in cost. Furthermore, where the coatings are tracked to other surfaces by vehicles, extensive cleanup may be required adding to the expense of a project.

The use of conventional asphalts for tack coats, in addition, often requires equipment adapted to maintain those products at an elevated temperature throughout the application procedure. Such equipment is often expensive to operate and difficult to maintain, which increases the cost and reduces the efficiency of the asphalt tack coats. Also as it relates to cutback asphalt products specifically, they contain volatile solvents that can damage the environment and are released into the atmosphere during the curing process. These volatile solvents in asphalt cutbacks further present safety issues during their storage and application. As a result, cutback asphalt products are, or could become, prohibited from general usage in many states.

Coal tar products made with the addition of various solvents may also be used as a bond coating between pavement layers. However, there are also many concerns with these tar products, such as the use of volatile and toxic solvents, carcinogenic concerns, and relatively low melting points resulting in soft and tacky surfaces creating similar environmental and tracking problems as with the prior asphalt-containing coatings.

SUMMARY OF THE INVENTION

The present invention provides a method for supplying a low-tracking, adhesive tack coat capable of bonding together layers of a pavement structure at ambient conditions for pavement construction, and, in one aspect at temperatures of about 140° F. (60° C.) to about 170° F. (77° C.). In one aspect, the method comprises applying an asphalt emulsion composition, at ambient conditions for pavement construction, to a substrate to produce a tack coating with a pen value(s) and a softening point(s) in the range of hard pen asphalt compositions. In one such aspect, the low tracking property of the tack coat is provided by a pen value of about 40 dmm or less and a softening point greater than about 140° F. (60° C.). The emulsion may be applied as a coating, spray, or other suitable delivery form in an amount sufficient to provide an effective tack coat.

The tack coat of the invention provides a durable low tack surface capable of resisting damage from vehicle traffic or other sources. The tack coat of the invention further softens, and may partially liquefy, when contacted by heated paving materials as such paving materials are applied to the coating and substrate. At these elevated temperatures, the tack coating is sufficiently adhesive to bond asphalt-containing or other pavement layers together in a pavement structure. The bond between the pavement layers may increase in strength as the structure cools below the softening point of the tack coat, and the tack coat rehardens. In one aspect, the bond between the tack coat produced by the method of the invention is significantly stronger than the bond provided by conventional tack coats.

In another aspect, the method may be used for bonding asphaltic pavement layers to a base or sub-base for a pavement structure in the construction of new pavement structures or may be used in rebuilding or restoring existing pavement structures. In this aspect, the method comprises providing an amount of the emulsion composition for forming the hard pen tack coat between at least one asphaltic pavement layer and a second pavement layer in an amount effective to form an adhesive interface between the layers upon heating of the hard pen coating by at least one of the pavement layers to a temperature sufficient to soften the hard pen coating.

In yet another aspect, the emulsion comprises at least a first phase of a hard pen asphalt composition and a second phase of water. The emulsion may contain emulsifiers, stabilizers, and/or additives to effectively emulsify and maintain the hard pen asphalt composition phase in a substantially emulsified form. In another aspect, the emulsion comprises at least a first phase of either a mid to soft pen asphalt and a second phase of water, with polymeric, waxes, or other additives sufficient to decrease the pen value and increase the softening point of the applied tack coat to the range of hard pen asphalt compositions, as well as emulsifiers, and/or stabilizers to effectively form and maintain the emulsion.

In this aspect of the method, the emulsion is applied as a coating, spray, or other suitable delivery form. The asphalt components and any polymeric or other equivalent additives are selected to provide a low tack surface at typical ambient condition for pavement construction, and an adhesive surface at temperatures exceeding about 170° F. (76° C.), such as those of newly applied asphaltic pavement layers.

In another aspect of the invention, the asphalt compositions used to form the asphalt phase of the emulsion are selected from hard pen asphalts to provide an effective tack coat that cures after application to a durable surface capable of accepting vehicle traffic without significant tracking or damage to the coating relative to prior conventional tack coats. In this aspect, the cured coating further provides sufficient adhesion between the pavement layers when heated by the application of heated pavement materials and then cooled after the pavement materials are compacted to prevent substantial slippage or shifting of the applied pavement materials due to traffic, environmental conditions, or other adverse conditions.

In yet another aspect, the asphalt composition of the first asphalt phase of the emulsion is selected from mid to soft pen asphalts, and the water phase incorporates polymeric, wax, or other equivalent additives that act with the asphalt composition to provide a hard pen tack coat. In this aspect, the polymer or other additives are selected to also provide a tack coat softening point effective to bond pavement layers at the applicable paving temperatures.

In one aspect of the method, the composition of the emulsion, the emulsion application rate, and the amount of applied emulsion is effective to form a tack coat that adheres and/or fuse asphaltic material to a roadway base or substrate. In this aspect, the asphalt composition of the asphalt phase and any additives are selected so that the emulsion cures to provide a low tack surface, typically in about 10 minutes to one hour, depending on weather conditions (i.e., surface temperature, wind, humidity, exposure to direct sunlight, etc.).

In yet another aspect of the method, the first phase of the emulsion comprises from about 30% to about 70% of a hard pen asphalt (or equivalent composition) based on the total weight of the emulsion. In one such aspect, the hard pen asphalt composition selected for use in the emulsion have pen values of about 5 dmm to about 15 dmm and a softening point between 150° F. (66° C.) and 160° F. (71° C.). The emulsion also comprises a second phase of water which provides from about 30% to about 70% of the total weight of the emulsion, as well as emulsifiers, stabilizers, and/or other additives in amounts of about 0.1% to about 3% of the total weight of the emulsion.

In an alternative aspect, the first phase emulsion comprises from about 30% to about 70% of asphalt compositions with pen values greater than about 40 dmm and softening points less than about 140° F. (60° C.). The asphalt phase and/or water phase further are provided with up to about 30% by weight of polymeric, waxes, or other additives in amounts sufficient to form a cured tack coat from the emulsion with pen values below 40 dmm and softening points above about 140° F. (60° C.). In this aspect, the balance of the emulsion comprises from about 30% to about 70% by weight water, with from 0.1% to about 3% emulsifiers, stabilizers and other additives.

In one aspect, the emulsion is applied at a rate of from about 0.01 to about 0.20 gal/sq. yd., (0.045 liters/sq. meter to 0.90 liters/sq. meter) and in another aspect from about 0.04 to about 0.08 gal/sq. yd (0.18 liters/sq. meter to 0.36 liters/sq. meter). In yet another aspect, the emulsion can be applied in multiple passes over the substrate layers at lower rates to achieve a comparable product, where the total application rate is equal to the sum of the multiple passes and is from about 0.01 to about 0.20 gal/sq. yd., (0.045 liters/sq. meter to 0.90 liters/sq. meter). The substrate layers may include soil, clay, sand, shell, cement, limestone, fly ash or mixtures thereof, and, in another aspect, the layers would comprise hot mix asphalt layers, a preexisting paving surface, or a scraped, ground, or scored paving surface.

In another aspect, the method produces a low-tracking tack coat that may be applied relatively easily to an existing substrate surface, which is both very effective and cost efficient. In one aspect, the tack coating dries relatively quickly, in about 5 to about 15 minutes, and in another aspect the tack coating cures in about 30 minutes to one hour, and resists cracking and separation from the existing base course. The properly cured base coat is resistant to damage by vehicle tires due to tracking and pick up of the coating on the vehicle tires and tracks. Thus, the method permits a delay of hours, days, or even weeks between application of the tack coating and of the application of the second pavement layer.

In yet another respect, when a heated pavement layer is laid down on the tack coat, heat from the pavement softens, and may re-liquefy, the asphalt composition of the coating, which becomes tacky and bonds or fuses the two layers together. This aspect of the method does not require the use of heated application appliances for the coating or the use of large quantities of energy to maintain the coating at elevated temperatures during treatment of the base or prepared pavement.

In another aspect, emulsifying and/or stabilizing additives may be selected such that the emulsion of the method can be prepared at temperature conditions that are typically used for making soft and moderate penetration asphalt emulsions. Due to the addition of such emulsifying agents and stabilizers, the hard pen asphalt emulsion can be produced at conventional temperatures and remains stable during storage.

In another aspect of the invention, a pavement structure is provided comprising a first substrate layer, and one or more additional layers of asphaltic or equivalent pavement materials, having the hard pen tack coat disposed there between. In another such aspect, additional pavement layers are added to the first pavement layer with the hard pen tack coat of the invention there between. In yet another aspect, the bond strength between the substrate and first pavement layer, and between each subsequent paving layer, is greater than the bond strength between the substrate and first layer, and between each subsequent layer, of the pavement structure formed with conventional tack coats.

The method of the invention provides good adhesive strength and bond strength between each layer of the pavement structure, so that the surfaces of each layer resist slipping or sliding relative to one another. The method allows scheduling flexibility in laying down the new pavement layer, such that additional pavement layers may be applied at a later date after the emulsion is cured.

The use of the method for pavement maintenance and/or rejuvenation increases the economic life of the pavement structure and, in some aspects, provides a better density at the pavement joints and throughout the pavement. Similarly, the method substantially eliminates the need for large volumes of cutback or other products with significant amounts of solvents and thinners that endanger the environment or surrounding personnel when they are released during the curing process. In one aspect of the invention, an analysis of the polycyclic aromatic hydrocarbons released by the tack coat of the invention were significantly reduced relative to other, particularly cutback, tack coat products, and in some instances were virtually undetectable.

DETAILED DESCRIPTION

One aspect of the method of the invention comprises the application of an emulsion of a hard pen asphalt material, or an equivalent as discussed herein, to an existing base or substrate for a pavement structure to provide a hard pen, low-tracking, adhesive tack coat between the existing substrate base and a new asphaltic pavement layer. In another aspect, the method provides for applying the tack coat significantly in advance of the application of the new substrate layer and, in some aspects, the method provides for application of the tack coat from hours to months in advance of the application of the new pavement layer. The base or substrate layers may include soil, clay, sand, shell, cement, limestone, fly ash or mixtures thereof, as well as asphaltic materials and prepared preexisting surfaces of pavement structures.

In one aspect of the method, the emulsion is prepared from an asphalt composition, water, emulsifiers, stabilizers, and/or other additives. In this aspect, the pen value of the asphalt composition component is less than about 40 dmm pen and possesses a softening point greater than about 140° F. (60° C.). In another aspect, the pen value of the asphalt composition component is from about 5 dmm to about 15 dmm pen, with a softening point between about 150° F. (66° C.) and about 160° F. (71° C.).

The emulsion may comprise at least a first asphalt phase and a second phase of water, as well as emulsifying agents, and/or stabilizing additives. The emulsion optionally may further include additives providing an anionic, cationic or neutral character to the final emulsion. The pen value or range of values of the asphalt composition providing the first asphalt phase, and the emulsifiers, stabilizers, and additives are selected so that the asphalt composition may be combined with the water phase at temperatures and under mixing conditions that produce a successful emulsion.

In one aspect, the emulsifier package includes emulsifiers suitable for use with hard pen asphalt having pen values under 40 dmm such as that available from Echo Star Science Technologies, Sacramento, Calif. The emulsifiers and/or stabilizers maintain the asphalt material in a stable suspension and control the breaking time, where the breaking time is the rate at which asphalt materials separate from the water phase permitting the evaporation of the water and forming the cured or set tack coating. The emulsifiers also may include surfactants, acid/base materials, etc. The stabilizers may include polycarboxylate polymers, preservatives, etc.

Other additives may include, but are not limited to, common polymers such as EVA, SBS, SB, SBR, SBR latex, waxes, polychloroprene, isoprene, polybutadiene, acrylic and acrylic copolymers, carbon reinforced elastomers, ground tire rubber, and/or other elastomers and plastomers to assist in obtaining desired breaking rates for the emulsion and adhesion of the asphalt emulsion residue. Long term stabilizers and/or other additives that are beneficial for a particular application also may be incorporated in the emulsion.

In preparing the emulsion, the asphalt composition component is mixed with water, emulsifiers, stabilizers and any other additives through a high-speed, high shear mechanical mixer, such as a colloid mill, or other equipment capable of emulsifying the concentrate constituents. The asphalt composition component, water, emulsifiers, stabilizers, and other additives typically are heated to assist in the dispersion of the asphalt composition. In one aspect, the temperature of the finished emulsion is maintained below about 212° F. (100° C.), and preferably from about 160° F. (71° C.) to 210° F. (99° C.). The use of such temperatures avoids boiling of the water phase which interferes with the emulsification process.

In the above aspect of the emulsion, the contemplated weight percentage of the asphalt composition component in at least the first phase is from about 30% to about 70% of the total weight of the emulsion (as used herein, all percentages are by weight). The water phase of the emulsion, in this aspect, comprises from about 30% to about 70% of the total weight of the emulsion. The emulsifiers, stabilizers, and/or other additives comprise from about 0.1% to about 3.0% of the total emulsion weight, and preferably from about 0.5% to about 3.0% of the total emulsion weight.

In an alternative form of the emulsion, the pen value of the asphalt composition is greater than about 40 dmm pen and possesses a softening point less than about 140° F. (60° C.), and may be in the range of mid or soft pen asphalt compositions (or mixtures thereof). In this form, the emulsion contains polymeric, waxes, or other equivalent additives that provide a final cured tack coat with a pen value(s) less than about 40 dmm pen and a softening point(s) greater than about 140° F. (60° C.). Examples of such polymeric additives are EVA, SBS, SB, SBR, SBR latex, polychloroprene, isoprene, polybutadiene, acrylic and acrylic copolymers, and other equivalent additives that produce the hard pen characteristics of the final cured tack coat.

This form of the emulsion also includes emulsifiers and stabilizers, and may include other additives to provide the desired handling and breaking characteristics. The polymeric additives, equivalents thereof, emulsifiers, stabilizers, and/or other additives in this form of the emulsion comprise about 0.1% to about 30.0% of the total weight of the emulsion.

In the form of the emulsion using mid to soft pen asphalt compositions, the above mentioned polymeric additives may be added to the first phase comprising the mid to soft pen asphalt, or alternatively the polymers may be added to the second water phase of the emulsion. The contemplated weight percentages of the asphalt composition component may comprise from about 30% to about 70% of the total weight of the emulsion and the water phase of the emulsion comprises from about 30% to about 70% of the total weight of the emulsion.

In one aspect of the method, the final emulsion is prepared by mixing a concentrate emulsion containing the first asphalt composition component, the emulsifiers, stabilizers and any other additives and water. In this aspect, sufficient water is added to the concentrate to provide the desired asphalt composition and/or additive content in the final emulsion. In one example of this approach, the concentrate is provided with an asphalt composition component comprising about 36% to about 70% of the total weight of the emulsion. The water phase of the emulsion, in this aspect, comprises from about 30% to about 64% of the total weight of the emulsion. The emulsifiers, stabilizers, and/or other additives comprise from about 0.1% to about 3.0% of the total emulsion.

The final emulsion using the concentrate comprising about 36% to about 70% asphalt composition may be mixed with an amount of water to provide 100 parts concentrate to 20 parts water. In such a final emulsion, the asphalt composition component comprises about 30% to about 58% by weight of the final emulsion. The water component comprises about 70% to about 42% of the final emulsion. In such an emulsion, the ratio of the hard pen asphalt composition to water in the final emulsion is from about 1:2.33 to about 1:0.7. In another example, the asphalt composition component comprises about 65% of the concentrate and sufficient water is added to provide a final emulsion comprised of about 32% to about 55% of the asphalt composition component.

As discussed above, the final emulsion having such ratios of hard pen asphalt to water also may be prepared directly from the constituents, rather than from a concentrate. The emulsion should remain stable during storage and typically may be stored for about 14 days, depending on the constituents. Some settling may occur, but a light (simple) agitation of the emulsion usually re-disperses asphalt into the concentrate.

The specific ratio of the first hard pen asphalt phase to the second water phase in the final emulsion chosen for a particular application will depend on factors such as the composition of the preexisting pavement or the base course materials and conditions, the number of planned applications; the desired cure time, and user agency regulations and/or specifications. Similarly, the emulsifiers, stabilizers, and other additives may be adjusted for specific application conditions, asphaltic materials, and substrates.

As mentioned above, the final emulsion is formulated such that, after proper application, the final coating possesses a maximum penetration of about 40 dmm and a minimum softening point of about 140° F. (60° C.) and in some aspects, from about 5 dmm to about 20 dmm with a softening point of about 150° F. (66° C.) to about 160° F. (71° C.). The asphalt composition grades used in the emulsion may be further defined by the upper end values of the Performance Grade (PG) values of the Strategic Highway Research Program (SHRP).

The asphalt composition grades may comprise about PG-91 upper end value (about 5 pen) to about PG-82 upper end value (an upper end value of about 40 pen) or their equivalents, and/or combinations thereof, and in some aspects from a PG-91 upper end value to a PG-85 (about 20 pen) upper end value. The asphalt composition component typically includes mixtures of asphalt (asphaltenes, maltenes and/or mixtures of other asphaltic components), residual emulsifier(s), and/or additives that would provide properties similar to asphalt grades possessing a penetration value under 40 dmm and a softening point greater than 140° F. (60° C.).

The properties of one aspect of the emulsion of the invention are as follows in the chart below describing the properties of the final emulsion and the hard pen asphalt tack coat. The test protocols are those described by the referenced standards published by ASTM, International ("ASTM"); the American Association of State Highway and Transportation Officials ("AASHTO"), and the Federal Highway Administration ("FHWA"). The examples provided below are only for illustrative purposes, and alternative formulations also may be used in the method of the inventions:

| Property | Test | Minimum | Maximum |
|---|---|---|---|
| EMULSION PROPERTIES | | | |
| Saybolt Furol Viscosity Seconds @ 77° F. (25° C.) | ASTM D88 | About 25 | — |
| Storage Stability, 24 hours, % by mass | ASTM D244 | — | About 1 |
| Storage Stability, 5 days, % by mass | ASTM D244 | — | About 5 |
| Residue by Evaporation, % by mass | ASTM D86 | About 30 | — |
| Naphtha Content, % by mass | ASTM D86 | — | About 1 |
| Sieve Test, % by mass | | — | About 0.15 |
| Fuel Resistance | ASTM D3370 | PASS | |
| TACK COAT PROPERTIES | | | |
| Penetration, 77° F. (25° C.), 100 g, 5 sec. dmm | ASTM D5 | About 1 | About 40 |
| R&B Softening Point Range | ASTM D36 | 140° F. (60° C.) | — |
| Residue by Distillation % by mass | ASTM D86 | About 30 | — |
| Original Binder DSR; G*/Sind @ 180° F. (82° C.) | AASHTO T315 | 1 | — |

As previously discussed, the final emulsion may be prepared in advance of its application or at a work site immediately before its application. In another aspect, it is possible to mix the concentrate with water at a rate sufficient to produce the desired final emulsion on a continuous basis during the application step using metering and mixing equipment known to those skilled in the art.

In the application step of the method, the hard pen asphalt final emulsion may be applied by hand spreading in one aspect, and in other aspects using conventional spreading or spraying equipment, or other comparable equipment. In one aspect, an effective amount of the emulsion may be obtained at a rate of about 0.01 to about 0.20 gal/sq. yd., (about 0.045 to 0.90 liters/sq. meter), and in one case an application rate of about 0.04 to about 0.08 gal/sq. yd. (about 0.18 to 0.36 liters/sq. meter) also may be used. In yet another aspect, the emulsion can be applied in multiple passes over the substrate layers at lower rates to achieve a comparable product, where the total application rate is equal to the sum of the multiple passes and is from about 0.01 to about 0.20 gal/sq. yd., (0.045 liters/sq. meter to 0.90 liters/sq. meter). For example, an emulsion may be applied in three passes over the substrate layer at application rates of about 0.01 gal/sq. yd. each, or a total application rate of about 0.03 gal/sq. yd. The rate of application of the emulsion may vary depending on the specified application conditions, composition of the emulsion, the surface to which it is applied, and the nature of the permanent materials and/or base that comprise the pavement structure, and other similar factors.

In one aspect, the temperature during application of the hard pen emulsion is from about 140° F. (60° C.) to about 180° F. (82° C.), and in another aspect from about 165° F. (74° C.) to about 175° F. (80° C.). Alternatively, the emulsion coat may be applied at ambient temperature (e.g. about 68° F. to 77° F. (about 20° C. to 25° C.)), which may affect the curing time of the emulsion. The emulsion typically is placed directly on top of the exposed surface of the existing prepared surface or base course and is allowed to cure before traffic passes over the coated surface or an additional layer of pavement is applied to the treated surface.

The applied hard pen final emulsion typically cures in about 15 minutes to about 45 minutes, and may cure as rapidly as about 5 to about 15 minutes after the emulsion is applied to the exposed surface of the prepared surface or base course. The cure rate will depend on the application rate, the dilution ratios used, the base course conditions, the weather, and other similar considerations. If the prepared pavement surface or base course contains excess moisture, the curing time of the emulsion may be increased.

After the tack coating is cured, traffic may be permitted to pass over the roadway or paving materials may then be applied to the base course. The hard pen tack coating creates a durable, low tack (and in some instances no tack) surface, and as such it restricts tracking to other surfaces via vehicle tires or treads.

In another aspect of the method, a layer of pavement materials is applied to the tack coated surface after the hard pen asphalt emulsion has cured. The pavement materials suitable for use in this aspect of the method are applied at elevated temperatures sufficient to heat the exposed surface of the coating to a temperature greater than about 140° F. (60° C.) when the pavement materials are applied to the coated substrate surface. In one example, conventional hot mix asphalt paving materials are applied at elevated temperatures such as about 212° F. (100° C.) to 350° F. (177° C.), and, also may be in excess of about 280° F. (138° C.). After the paving materials are applied, they are compacted or otherwise pressed in place in preparation for the next paving course or finishing of the traffic bearing surface of the structure.

Without being limited to one theory for the success of the invention, at such temperatures, it is believed that the layer of heated paving materials softens, and in some aspects, liquefies the hard pen tack coat to form an adhesive interface between the pavement layer and substrate (or between pavement layers) to bind and/or fuse the pavement layer and substrate together when the tack coat rehardens, normally by cooling. When the new pavement layer cools and hardens, as discussed above, the hard pen asphalt residue layer also cools and hardens to form an effective bond between the layers.

It also is believed that when compaction occurs, the pavement and/or base layers may become interlocked with the tack coat. Thus, the complete pavement structure or substructure is provided with a strong bond which inhibits, and in some aspects prevents, the movement or separation of the pavement layers.

Thus, the method of the invention provides a multi-layer pavement structure with hard pen asphaltic tack coat/binder between each layer. As also discussed below, the bonding between layers of such structures can be superior to paving structures made using conventional tack coats and cutback asphalt tack coats. The structure provided by the method of the invention may include a substrate and one or more asphalt or other paving layers with a tack coat between the substrate and first paving layer, and between subsequent layers. The structure of the invention also may comprise multiple layers of new or existing paving surfaces, with the tack coat therebetween. It may include an existing paving surface that is treated, grooved or otherwise prepared to receive one or more layers of paving materials.

In view of the air pollution/quality issues of concern with conventional emulsion and cut-back products, the undesirable polycyclic aromatic hydrocarbon (PAH) levels produced by one example of an asphalt composition component used in the emulsion of the invention was measured, which provides an estimate of the PAH levels produced by the set or cured emulsion after application to a suitable surface. The measurements were made of a grade of asphalt with a penetration value of about 20 dmm. The tests were conducted by DHL Analytical, Round Rock, Tex., using a method referenced as Method SW8270C.

The PAH's from this sample were undetectable under those criterion for 16 of the 19 of the tested PAH's and were well within the acceptable levels for the remaining three PAH's (2-Fluorobiphenyl, 81.9; 4-Terphyl-d14, 66.1; and Nitrobenzene-d5, 80.0; where the acceptable range was 40-140). These results were superior to conventional tack coat emulsion and cutback products. The PAH levels, of course, will depend on the specific composition of the emulsion used to form the tack coat.

EXAMPLES

One example of the method was used to form a tack coat by applying the emulsion of the invention using a 13 dmm pen asphalt, comprising about 33% by weight of the emulsion. The emulsion was applied at a rate of 0.03 gal/sq. yd. (0.135 liters/sq. meter) to a first layer of asphaltic pavement material and was covered by a second layer of asphaltic pavement material. The asphalt emulsion sample was identified as TT (Trackless tack).

A conventional MS (medium set) emulsion also was applied at the same rate to the first asphaltic layer and covered by the second layer of asphaltic materials. The MS emulsion contained a minimum 50 dmm pen asphalt that comprised at least about 62% of the emulsion. Core samples were taken from each portion of the pavement structure and tested for the shear force required to separate the layers apart, and the bond strength between layers was calculated. The test results for both types of tack coats are listed below:

TABLE 1

| Sample | Core Diameter (in) | Area (in²) | Shear Force to Separate Layers (lbs) | Bond Strength (psi) |
|---|---|---|---|---|
| Tack Coat Formed By Medium Set (MS) Emulsion | | | | |
| MS-1 | 5.95 | 27.81 | 1440 | 51.8 |
| MS-2 | 5.94 | 27.69 | 1920 | 69.3 |
| MS-3 | 5.95 | 27.84 | 2080 | 74.7 |
| MS-4 | 5.95 | 27.81 | 1840 | 66.2 |
| MS-5 | 5.95 | 27.81 | 2020 | 72.6 |

TABLE 1-continued

| Sample | Core Diameter (in) | Area (in²) | Shear Force to Separate Layers (lbs) | Bond Strength (psi) |
|---|---|---|---|---|
| MS-6 | 5.96 | 27.85 | 3070 | 110.2 |
| MS-7 | 5.95 | 27.81 | 2540 | 91.4 |
| Average | 5.95 | 27.80 | 2130 | 76.6 |
| Tack Coat Formed By Improved Method | | | | |
| TT-1 | 5.94 | 27.75 | 2790 | 100.5 |
| TT-2 | 5.95 | 27.81 | 2360 | 84.9 |
| TT-3 | 5.95 | 27.79 | 2200 | 79.2 |
| TT-4 | 5.95 | 27.81 | 1800 | 64.7 |
| TT-5 | 5.95 | 27.81 | 2300 | 82.7 |
| TT-6 | 5.95 | 27.81 | 2980 | 107.2 |
| TT-7 | 5.95 | 27.78 | 2020 | 72.7 |
| Average | 5.95 | 27.79 | 2350 | 84.6 |

Accordingly, Table 1 represents a relative comparison of the two tack coats based on using the same asphalt conditions for application of the emulsions. Different results may be obtained when different asphalts and/or conditions are used, however, the general relative outcome for the two types of methods should be very similar.

In another example, the method of the invention was used to form a tack coat by applying the emulsion of the invention using a 13 dmm pen asphalt, comprising about 37% by weight of the emulsion. The emulsion was applied at a rate of 0.03 gal/sq. yd. (0.135 liters/sq. meter) to a first layer of an asphaltic pavement material and was covered by a second layer of asphaltic pavement material.

A conventional RS (rapid set) emulsion also was applied to the first asphaltic layer at the same rate and covered by the second pavement layer. The asphalt in the RS emulsion was a minimum of about 60 dmm pen comprising at least about 62% of the emulsion. The bond created by the RS emulsion between the layers also was tested. Core samples were taken from the pavement structure after the passage of similar curing times and tested for the force required to shear the layers apart, and the bond strength between layers was calculated. The test results for both types of tack coats is listed below:

TABLE 2

| Tack Type | Core ID | PSI | Interface Condition |
|---|---|---|---|
| RS | 1-1 | 70 | Wet |
| | 1-2 | 121 | Damp |
| | 1-3 | 116 | Damp |
| | 1-4 | 87 | Wet |
| | 1-5 | 105 | Wet |
| | 1-6 | 95 | Wet |
| Tack Coat Formed By Improved Method | 2-1 | 61 | Wet |
| | 2-2 | 188 | Dry |
| | 2-3 | 178 | Dry |
| | 2-4 | 178 | Dry |
| | 2-5 | 161 | Dry |
| | 2-6 | 150 | Dry |

| | Tack Type | PSI |
|---|---|---|
| Average | RS (Section 1) | 99 |
| | Improved Method | 153 |
| | Difference between Types | 54 |

Accordingly, this data confirms the increased bonding and curing time produced by the method of the invention.

While the invention has been described by reference to certain specific descriptive examples which illustrate preferred materials and conditions, it is understood that the invention is not limited thereto. Rather, the invention includes all alternatives, modifications and equivalents within the scope of this disclosure.

What is claimed is:

1. A method for bonding a layer of asphalt pavement material comprising asphalt material to a substrate pavement layer comprising paving material, the paving material selected from the group consisting of asphalt material, soil, clay, sand, shell, cement, limestone, fly ash and mixtures thereof, the method comprising:

providing an emulsified composition which includes at least a first phase of an asphalt composition, a second phase of water, emulsifier and a stabilizer, the asphalt composition selected to provide a coating having a penetration value less than about 20 dmm and a softening point greater than about 140° F. (60° C.) when applied to the substrate pavement layer and cured;

applying the emulsified composition which includes the first phase of asphalt composition, and the second phase of water, emulsifier and stabilizer to an exposed surface of the substrate pavement layer at a rate sufficient to provide an exposed coating on the exposed substrate surface, the emulsified composition having an amount of the asphalt composition effective to bond the layer of asphalt pavement material to the substrate pavement layer;

heating the asphalt pavement material to provide a heated pavement material to a temperature sufficient to soften the coating an amount effective to form a bonding surface on the exposed coating; and applying the heated asphalt pavement material to the exposed coating to form a pavement layer and to soften the exposed coating forming a bond between the pavement layer and the substrate pavement layer.

2. The method of claim 1 wherein the asphalt composition has a penetration rating of less than or equal to about 15 dmm, and a softening point temperature of at least about 150° F. (66° C.).

3. The method of claim 1 wherein the asphalt composition phase comprises from about 30% to about 70% of the total weight of the emulsified composition.

4. The method of claim 1 wherein the water phase comprises from about 30% to about 70% of the total weight of the emulsified composition.

5. The method of claim 1 wherein the emulsifier further comprises stabilizers, additives, and polymers, which comprise from about 0.1% to about 30% of the total weight of the emulsified composition.

6. The method of claim 1 wherein the emulsified composition is applied to the substrate pavement layer in one or more applications having a total application rate of about 0.01 to about 0.20 gallons per square yard.

7. The method of claim 1 wherein the emulsified composition is applied to the substrate pavement layer at a temperature of about 140° F. (60° C.) to about 180° F.

8. The method of claim 1 wherein the emulsified composition is applied to the substrate pavement layer at temperatures not exceeding about 212° F. (100° C.).

9. The method of claim 1 wherein the pavement material is heated to a temperature sufficient to heat the exposed coating to a temperature greater than about 140° F. (60° C.) when the pavement material is applied to the exposed coating on the substrate pavement layer.

10. The method of claim 8 wherein the asphalt pavement material is a hot mix asphalt heated to a temperature greater than at least about 212° F. (100° C.).

11. The method of claim 1 wherein the asphalt composition of the first phase is selected to provide cure time of the emulsified composition from about 5 to about 60 minutes; and the emulsified composition applied to the substrate pavement layer is allowed to cure for at least the cure time to form a traffic bearing surface before the pavement layer is applied to the substrate pavement layer.

12. The method of claim 2 wherein the emulsified composition is prepared at a temperature of less than about 212° F. (100° C.).

13. The method of claim 1 wherein the emulsified composition includes the asphalt composition comprising an asphalt having a penetration value greater than about 40 dmm and a softening point less than about 140° F. (60° C.) and penetration altering additives effective to provide a coating having a penetration value less than about 20 dmm and a softening point above about 140° F. (60° C.) when applied to the substrate pavement layer and cured.

14. The method of claim 13 wherein the penetration altering additives are polymeric compositions selected from at least the group consisting of EVA, SBS, SB, SBR, SBR latex, waxes, polychloroprene, isoprene, polybutadiene, acrylic and acrylic copolymers.

15. A method for forming a low-tracking tack coating capable of bearing traffic without significant loss of bonding strength on a substrate pavement layer and paving the substrate pavement layer with an asphalt pavement material, the substrate pavement layer comprising paving material, the paving material selected from the group consisting of asphalt material, soil, clay, sand, shell, cement, limestone, fly ash and mixtures thereof, the method comprising:

providing an emulsified composition which includes at least a first phase of an asphalt composition, and a second phase of water, emulsifier and a stabilizer, the asphalt composition selected to provide a coating having a penetration value less than about 20 dmm and a softening point greater than about 140° F. (60° C.) when applied to the substrate pavement layer and cured, the asphalt phase comprising from about 30% to about 70% of the total weight of the emulsified composition and the second phase comprising from about 30% to about 70% of the total weight of the emulsified composition;

applying the emulsified composition to an exposed surface of the substrate pavement layer at a rate sufficient to provide an exposed coating on the exposed surface, the emulsified composition having an amount of the asphalt composition effective to bond the asphalt pavement material to the substrate pavement layer;

exposing the coating to the atmosphere for not more than about sixty minutes to provide a cured coating, the curing effective to permit traffic to pass over the cured emulsified composition without the cured coating substantially adhering to tires of the traffic;

heating the asphalt pavement material to provide a heated pavement material to a temperature of greater than about 140 degrees F. and sufficient to soften the cured coating an amount effective to form a bonding surface on the exposed coating; and applying the heated asphalt pavement material to the cured coating to form a pavement layer and to soften the cured coating forming a bond between the pavement layer and the substrate pavement layer.

16. The method of claim 15 wherein the asphalt composition phase comprises an asphalt with a penetration rating of less than about 15 dmm, and a softening point temperature of at least about 150° F. (66° C.).

17. The method of claim 15 wherein the emulsifier further comprises stabilizers, additives, and polymers, which comprise from about 0.1% to about 30% of the total weight of the emulsified composition.

18. The method of claim 15 wherein the emulsified composition is applied to the substrate pavement layer in one or more applications having a total application rate of about 0.01 to about 0.20 gallons per square yard.

19. The method of claim 17 wherein the emulsified composition is applied to the substrate pavement layer at temperatures not exceeding about 212° F. (100° C.).

20. The method of claim 19 wherein the asphalt pavement material is a hot mix asphalt heated to a temperature greater than at least about 212° F. (100° C.).

21. The method of claim 15 wherein the emulsified composition includes an asphalt composition comprising an asphalt having a penetration value greater than about 40 dmm and a softening point less than about 140° F. (60° C.) and penetration altering additives effective to provide a coating having a penetration value less than about 20 dmm and a softening point above about 140° F. (60° C.) when applied to the substrate pavement layer and cured.

22. The method of claim 21 wherein the penetration altering additives are polymeric compositions selected from at least the group consisting of EVA, SBS, SB, SBR, SBR latex, waxes, polychloroprene, isoprene, polybutadiene, acrylic and acrylic copolymers.

23. A pavement structure comprising a substrate pavement layer comprising paving material selected from the group consisting of asphalt material, soil, clay, sand, shell, cement, limestone, fly ash and mixtures thereof, at least one layer of asphalt pavement material, and at least one bonding layer between the substrate pavement layer and the asphalt pavement layer, the bonding layer formed from an application of an emulsified composition having at least a first phase of an asphalt composition, a second phase of water, emulsifier and a stabilizer the asphalt composition selected to provide the bonding layer with a penetration value less than about 20dmm and a softening point greater than about 140° F. (60° C.) when cured.

24. The pavement structure of claim 23 wherein the asphalt composition phase of the emulsified composition comprises from about 30% to about 70% of the total weight of the emulsified composition.

25. The pavement structure of claim 24 wherein the emulsified composition was applied to the substrate pavement layer at temperatures not exceeding about 212° F. (100° C.).

26. The pavement structure of claim 23 wherein a bond between the asphalt pavement layer and the substrate pavement layer is formed by heating the bonding layer with heated asphalt pavement material which forms the asphalt pavement layer, the asphalt pavement material heated to a temperature greater than about 140° F. (60° C.) to provide a bonding interface between the pavement layer and the substrate pavement layer.

27. The pavement structure of claim 26 wherein the asphalt pavement material is a hot mix asphalt heated to a temperature greater than at least about 212° F. (100° C.).

28. The pavement structure of claim 23 wherein additional asphalt pavement layers are added to the asphalt pavement layer, and a bonding coating formed by the emulsified composition is disposed between each layer to provide a bonding interface as each layer is applied.

29. The pavement structure of claim 23 wherein the bonding layer is formed from an emulsified composition which includes an asphalt composition comprising an asphalt having a penetration value greater than about 40 dmm and a softening point less than about 140° F. (60° C.) and penetration altering additives effective to provide the bonding layer with a penetration value less than about 20 dmm and a softening point above about 140° F. (60° C.) when cured.

30. The pavement structure of claim 29 wherein the penetration altering additives are polymeric compositions selected from at least the group consisting of EVA, SBS, SB, SBR, SBR latex, waxes, polychloroprene, isoprene, polybutadiene, acrylic and acrylic copolymers.

31. A method for bonding a layer of asphalt pavement material comprising asphalt material to a substrate pavement layer comprising paving material, the paving material selected from the group consisting of asphalt material, soil, clay, sand, shell, cement, limestone, fly ash and mixtures thereof, the method consisting essentially of:
    providing an emulsified composition which includes at least a first asphalt phase of an asphalt composition, a second phase of water, emulsifying and stabilizing additives, the asphalt composition selected to provide a coating having a penetration value less than about 20 dmm and a softening point greater than about 140° F. (60° C.) when applied to the substrate pavement layer and cured, the asphalt phase comprising from about 30% to about 70% of the total weight of the emulsified composition and the second phase comprising from about 30% to about 70% of the total weight of the emulsified composition;
    applying the emulsified composition which includes the first phase of asphalt composition, and second phase of water, the emulsifying additive and the stabilizing additive to an exposed surface of the substrate pavement layer at a rate sufficient to provide an exposed coating on the exposed surface, the emulsified composition having an amount of the asphalt composition effective to bond the asphalt pavement material layer to the substrate pavement layer;
    curing the exposed coating of emulsified composition for not more than about sixty minutes to provide a cured coating, the curing effective to permit traffic to pass over the cured emulsified composition without the cured coating substantially adhering to tires of the traffic;
    heating the asphalt pavement material to provide a heated pavement material to a temperature of greater than about 140 degrees F. and sufficient to soften the cured coating an amount effective to form a bonding surface on the exposed coating; and
    applying the heated asphalt pavement material to the cured coating to form a pavement layer and to soften the cured coating forming a bond between the pavement layer and the substrate pavement layer.

32. The method of claim 31 wherein the asphalt composition has a penetration rating of less than or equal to about 15 dmm, and a softening point temperature of at least about 150° F. (66° C.).

33. The method of claim 32 wherein the emulsified composition is applied to the substrate pavement layer in one or more applications having a total application rate of about 0.01 to about 0.20 gallons per square yard.

* * * * *